No. 712,733. Patented Nov. 4, 1902.
J. A. SHEARER.
STEEL SPRING TIRE FOR VEHICLES.
(Application filed Oct. 31, 1901.)
(No Model.) 2 Sheets—Sheet 1.
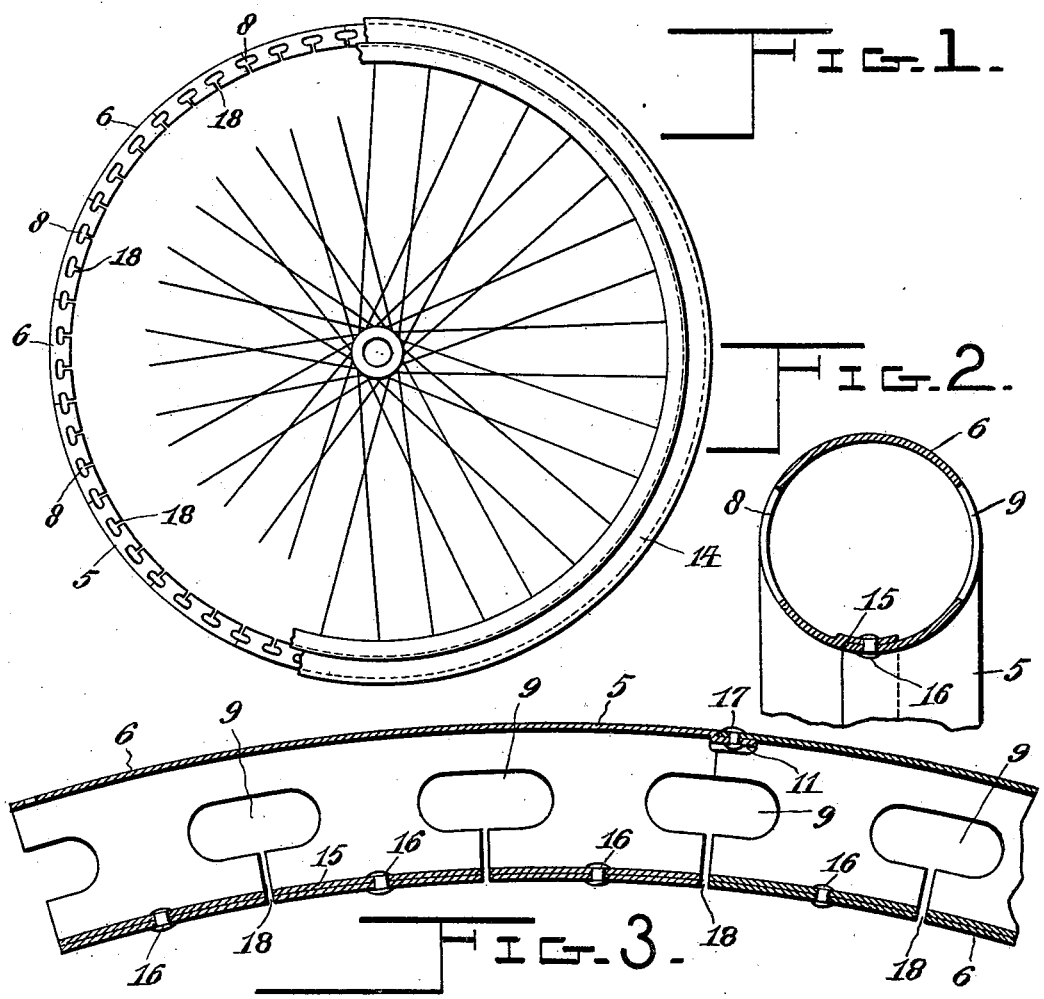

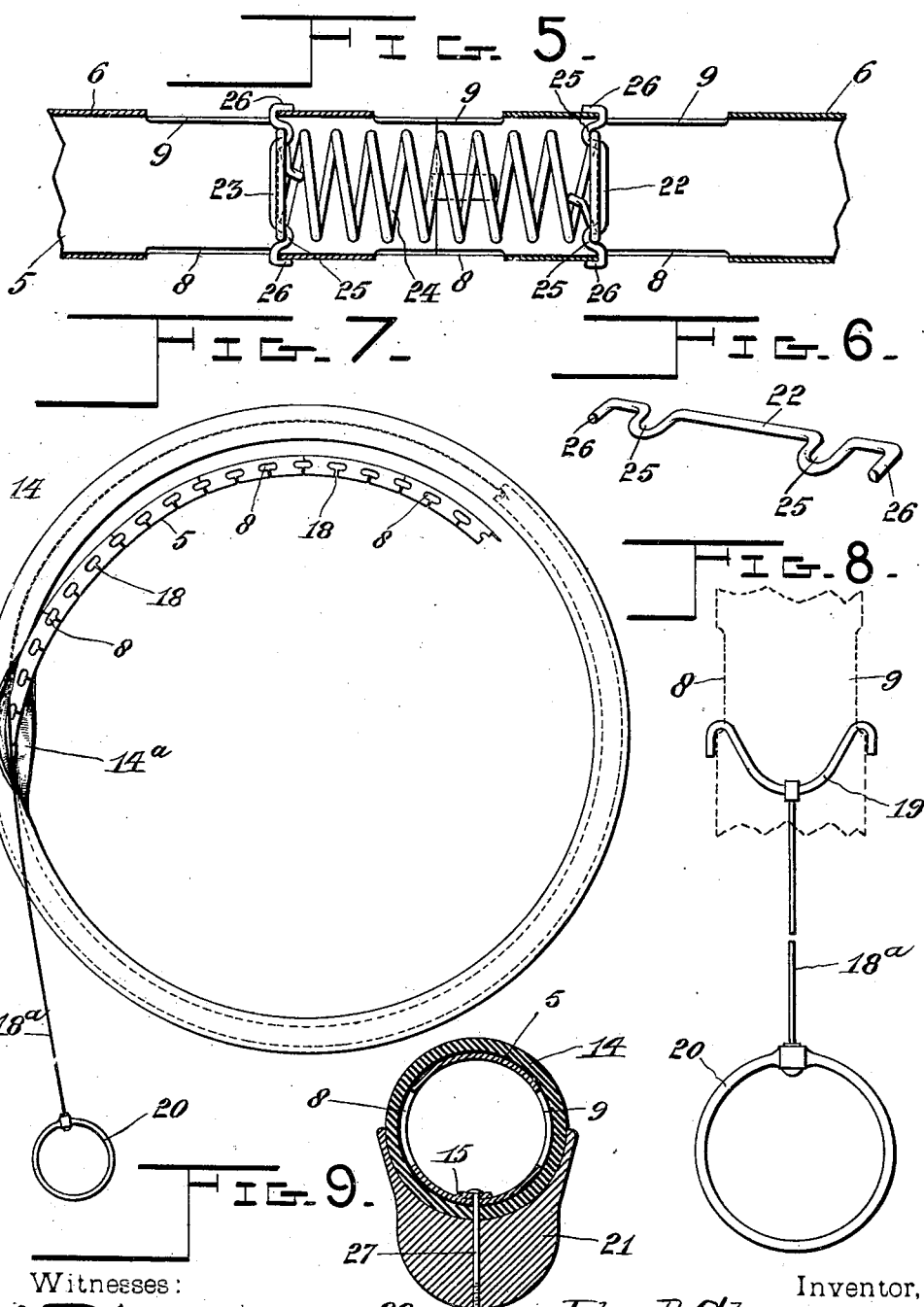

UNITED STATES PATENT OFFICE.

JOHN A. SHEARER, OF SCHENECTADY, NEW YORK.

STEEL SPRING-TIRE FOR VEHICLES.

SPECIFICATION forming part of Letters Patent No. 712,733, dated November 4, 1902.

Application filed October 31, 1901. Serial No. 80,586. (No model.)

*To all whom it may concern:*

Be it known that I, JOHN A. SHEARER, a subject of His Majesty the King of Great Britain, residing at Schenectady, county of Schenectady, State of New York, have invented certain new and useful Improvements in Steel Spring-Tires for Use on Bicycles, Motor-Vehicles, &c.; and I do hereby declare that the following is a full, clear, and exact description of the invention, such as will enable others skilled in the art to which it appertains to make and use the same.

My invention relates to improvements in steel spring-tires for use on bicycles, motor-vehicles, and any and all other classes of vehicles which it is desired to equip with resilient tires in order to insure easy motion to the occupant.

In the present invention I seek to provide a substitute for the well-known inflatable tire, which is open to the very serious objection of liability to puncture, thus making the rider of a bicycle have a feeling of uncertainty about the tire giving satisfactory service when undertaking a long ride or through a section of the country wherein difficulty may be experienced in making repairs. A tire of my invention will relieve the rider of this feeling of apprehension, because it will not collapse if punctured or cut and it will remain in serviceable condition, so that the trip or journey can be accomplished without delay.

The improved tire has a certain amount of inherent resiliency to insure easy motion to the cycle or vehicle. It may be easily applied to the rim of a wheel. It is intended to hold itself in place on the wheel-rim by compression and frictional engagement, although positive fastening devices may be employed, if desirable or necessary. It provides a smooth outer or tread surface for engagement with the ground and a similar smooth inner surface for the wheel-rim, and it is susceptible of manufacture without any increase of the first cost as compared with an inflatable tire, although it is more economical in service, because of the absence of repairs and its increased length of use and durability.

With these ends in view the invention consists in the novel combination, construction, and arrangement of parts, which will be hereinafter fully described and claimed.

In the drawings hereto annexed, forming a part of this specification, Figure 1 is a side elevation of a wheel equipped with a steel spring-tire of my invention, a part of the wheel-rim and the outer tire-casing being broken away. Fig. 2 is an enlarged cross-section through the metallic resilient core of the improved tire. Fig. 3 is an enlarged sectional view taken longitudinally through a portion of the resilient metallic core, showing two of the sections thereof. Fig. 4 is a detail perspective view of the blank for one section of the metallic resilient core, a number of which are employed to form the complete tire according to the lineal circumference of the wheel. Fig. 5 is a sectional view through the meeting portions of the resilient metallic core, showing the means for yieldably coupling the end portions of said core together. Fig. 6 is a detail perspective view of one of the coupling-links. Fig. 7 is an elevation illustrating graphically the method of placing the resilient metallic core within a seamless tube or casing of the tire. Fig. 8 is a detail view illustrating the means for connecting the drawing-wire or its equivalent to a portion of the metallic core. Fig. 9 is a cross-section through the wheel-rim and the improved tire, illustrating a fastening expedient which may be resorted to in case the tire does not firmly retain itself in place on the wheel-rim.

The same numerals of reference denote like parts in all the figures of the drawings.

The leading feature of my invention consists of a resilient metallic core, which is indicated in its entirety by the numeral 5. This metallic core is made or built up of a plurality of segmental sheet-metal sections 6, and each section is stamped or struck up in a single piece of sheet-steel of the proper gage or thickness, the blank being indicated by the numeral 7 in Fig. 4. This sheet-metal blank is in flat form, nearly rectangular in shape, and provided with the slots 8 9, which are formed longitudinally in the blank, on opposite sides of the median line thereof and in the end portions of the metal. From the slots 8 9 extend the recesses 10, which are of tapering form and communicate with the slots and open through the edges of the metallic blank. At one end this blank is provided with an integral tongue 11, having a rivet-perforation 12, and in the other end of the blank is formed a rivet-perforation 13. The blank is first stamped in flat form from the piece of sheet metal according to the illustration in Fig. 4. The blank is then doubled or rolled lengthwise in order to give a circular cross-section thereto, as shown by Figs. 2 and 9, although the blank may be bent to an oval form in cross-section, if desired. In bending the blank upon itself it is also given the longitudinal curved shape proper to fit around the rim of a wheel and within the outer tube or casing 14, thus making one side of the segmental core-section somewhat shorter than the outer tread-surface of the core-section. The edges of the blank are brought into overlapping relation to form the lap-joint (indicated at 15 in Fig. 2) on the inner rim-surface of the core-section, and this lap-joint contemplates the bending of one edge of the blank so as form an offset adapted to receive the other edge of the blank, so that the outer surface of the core-section on the inner rim side of the tire will be practically flush. The lapped portions of the blank forming the core-section on the inner rim-surface thereof are united together by the rivets 16 or their equivalents, as shown by Figs. 2 and 3. The operation of rolling or bending the blank into the longitudinal segmental shape and into the circular or oval cross-sectional shape brings the slots 8 9 on opposite sides of the core-section and makes the recesses 18 of the slots 8 9 assume coincident positions, so as to open through the inner rim-surface of the core-section, and these recesses and the slots provide for the yielding or easing play of the metallic core-section, whereby the sections of the metallic core are adapted to give somewhat independently of each other. The metal from which the blank is formed is tempered to give a certain degree of elasticity or springiness thereto.

In making the complete core a number of the segmental core-sections 6 are brought together and placed endwise with respect to one another, and the tongue 11 of each core-section is bent down, as shown by Fig. 3, so as to fit into the end portion of an adjacent core-section, thereby forming a lap-joint on the outer tread-surface of the core-sections, as shown by Fig. 3, and bringing the hole 12 in the tongue in coincidence with the aperture 13 of the underlapped core-section. A rivet or its equivalent 17 is passed through the coincident openings in the tongue and the core-section, so as to unite the two core-sections together in flush relation, but the inner rim-surfaces of the core-sections are not joined together, but they are free to yield or give, because a space 18 exists between them, the end of the core-sections being beveled somewhat, as shown by Fig. 4, so as to form this space 18, and thereby permit the core-sections to have the desired play. The proper number of segmental sections 6 to form the complete core are united together in the manner described, except that the end sections are unattached, as shown by Fig. 7, in order to facilitate the introduction of the resilient metallic core within the seamless casing or tube 14. This tube is cut or slit for a certain distance on its inner rim-surface, as indicated at 14ᵃ in Fig. 7, and through this cut or slit is introduced the metallic core in the manner shown by Figs. 7 and 8. To facilitate the introduction of the core into the casing, I employ the drawing wire or cord 18ᵃ and the hook 19, said drawing-wire being provided with a ring 20 or other handhold. The hook 19 is provided with two curved portions adapted to take into the slots 8 9 at one end of the core. The drawing-wire 18 is first passed through the tube or casing 14 by introducing one end thereof through the cut or incision 14ᵃ of the casing and drawing or shoving the wire entirely through the casing until its end again emerges through the cut or incision 14ᵃ. After this the free end of the wire 18 is attached to the hook 19, and the hook is then engaged with the slots 8 9 at or near one end of the metallic core formed by the connected segmental sections. The end of the core 5, which has the hook 19 attached thereto, is now inserted through the slit 14ᵃ of the tube, and the wire 18 is drawn by means of the hold 20, so as to pull the core into the casing until the entire core is housed therein. The two ends of the core are brought opposite to the slit or cut 14ᵃ of the casing, so that the hook 19 may be disengaged from the core, thus facilitating the removal of the core-drawing appliance.

In order to make the tire frictionally embrace the wheel-rim 21, so as to hold itself in place thereon, and, furthermore, to hold the two ends of the core in proper relation to each other, I employ the yieldable coupling device shown by Figs. 5 and 6. This coupling device contemplates the employment of the cross rods or bars 22 23 and the coiled spring 24. Each cross rod or bar is bent from a single piece of metal, preferably stout wire, so as to provide the seats 25 and the hooks 26, said hooks being arranged at the ends of the cross-bar and the seats lying between the hooks. One bar 22 is engaged with the slots at or near the end of one section of the core. The other bar 23 has its hooks engaged with the slotted portion on the opposite end of the core, and the spring 24 is disposed between the two cross-bars, so that it may properly engage with the seats 25 thereof. I prefer to make each end of the spring with a double hook adapted to engage with the two seats of one cross-bar, thus equalizing the strain of the spring on the cross-bar and the end portion of the core. The spring is housed or contained within the hollow metallic core, and it tends to draw the expansible yieldable core together at the disconnected end portions thereof, whereby the tire is made to hold itself in place on the rim.

After the core shall have been placed within the casing 14 and the spring-coupling applied to unite the end portions of the core together the slit or opening 14ᵃ in the casing should be closed in any usual way. The tire may now be sprung upon the wheel-rim 21, and it is intended that the tire shall hold itself in place by frictional engagement. If it is found that the tire has a tendency to "creep" or become displaced circumferentially upon the rim, auxiliary fastening devices may be resorted to, as shown by Fig. 9. These fastening devices may be in the form of bolts, three or more in number, and passed through the core, the casing, and the rim, as indicated by the numeral 27 in Fig. 9, each bolt having a nut 28 on the inner face of the wheel-rim.

In making tires for the different varieties of vehicles—such as bicycles, motor-vehicles, and wagons or carriages, &c.—the gage of the steel forming the core-section, the size of the slots or perforations in the core-sections, and the size of the core-sections themselves will be required to be regulated by the weight that is imposed upon the tire. The outer casing or tube 14 is preferably of rubber or rubber fabric, although any other material may be employed.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. A yielding tire formed of sheet-metal segments having T-shaped slots on each side and bent into tubular form and having the slotted sides thereof joined together at the inside of the tire.

2. A yielding tire formed of sheet-metal segments having T-shaped slots on each side and having the ends thereof joined together at the inside of the tire in combination with flexible casing covering the same.

3. A yielding tire consisting of a tubular portion of resilient material having lateral elongated slots extending longitudinally of the tire, and transverse slots extending circumferentially and joining said longitudinal slots together around the side next the felly, thus forming an H-shaped slot in the inside half of the tire.

4. A yielding tire consisting of a tubular portion of resilient material having lateral slots extending circumferentially of the tire, transverse slots joining said longitudinal slots together at the back, and a casing of flexible material in which said tubular portion is mounted.

5. In a tire of the class described, a metallic core comprising segmental members each bent from a sheet-metal blank having the edges united together and provided with easement openings or slots, as set forth.

6. In a tire of the class described, the combination of a metallic core having yieldable segmental members and a yieldable coupling between the free ends of two end members of the core, as set forth.

7. In a tire of the class described, the combination of a metallic core formed by segmental yieldable members, cross-bars engaging with end members of said core, and a coupling-spring engaging with said bars, substantially as described.

8. The combination with a rim, of a tire frictionally engaging said rim and comprising a casing, a metallic core having connected yieldable segmental members, and a spring-coupling connecting end members of said core, substantially as set forth.

9. A yielding tire consisting of a tubular portion of resilient material having lateral slots extending circumferentially of the tire, and transverse slots joining said longitudinal slots together at the back, the tread of said tubular portion being made of solid continuous metal.

10. A blank for the resilient core of a tire consisting of a quadrangular base of sheet metal having longitudinal oval slots on each side thereof, and transverse tapered slots extending from the center of the longitudinal slots rectangularly to the edge of the blank and having their wide ends at the edge of the blank and their narrow or pointed ends opening into said slots.

In witness whereof I have hereunto set my hand in the presence of two witnesses.

JOHN A. SHEARER.

Witnesses:
C. E. IRVING,
L. A. IRVING.